United States Patent [19]

Robinson

[11] Patent Number: 4,954,469
[45] Date of Patent: Sep. 4, 1990

[54] GRANULATED ACTIVATED CARBON FOR WATER TREATMENT

[76] Inventor: Ken K. Robinson, 5 N 553 Jens-Jensen La., St. Charles, Ill. 60175

[21] Appl. No.: 368,077

[22] Filed: Jun. 15, 1989

Related U.S. Application Data

[63] Continuation-in-part of Ser. No. 226,789, Aug. 1, 1988, abandoned.

[51] Int. Cl.$^5$ .................. B01J 20/12; B01J 20/20; B01J 20/26; B29C 67/02
[52] U.S. Cl. .................. 502/80; 210/694; 264/117; 264/122; 502/402; 502/404; 502/413; 502/416; 502/432
[58] Field of Search .............. 502/62, 80, 413–417, 502/402, 430, 432; 264/117, 122

[56] References Cited

U.S. PATENT DOCUMENTS

| | | | |
|---|---|---|---|
| 1,899,339 | 2/1933 | Klebert | 502/80 |
| 3,352,788 | 11/1967 | Conlisk et al. | 210/679 |
| 3,391,234 | 7/1968 | Walenciak et al. | 264/117 |
| 3,544,507 | 12/1970 | Lloyd | 55/387 |
| 3,901,823 | 8/1975 | Dimitri et al. | 264/117 |
| 3,951,859 | 4/1976 | Inaba et al. | 502/402 |
| 3,955,944 | 5/1976 | Grant | 55/74 |
| 4,029,567 | 6/1977 | Farnand et al. | 208/426 |
| 4,076,892 | 2/1978 | Fennimore et al. | 502/402 |
| 4,082,694 | 4/1978 | Wennerber | 55/75 |
| 4,518,704 | 5/1985 | Okabayashi et al. | 502/80 |
| 4,677,086 | 6/1987 | McCue et al. | 502/80 |
| 4,795,735 | 1/1989 | Liu et al. | 502/417 |
| 4,857,243 | 8/1989 | Von Blucher et al. | 264/117 |

OTHER PUBLICATIONS

Capes et al., I & EC Process Design & Development, 6(1), 146–154, Jan. 1967.

Primary Examiner—Paul E. Konopka
Attorney, Agent, or Firm—Mathew L. Kalinowski

[57] ABSTRACT

A granulated activated carbon is produced by spherically agglomerating activated carbon powder in an aqueous slurry in the presence of a bridging liquid and a binder. At least about 50% of the carbon powder has a surface area of from about 2800 to about 3500 m$^2$/gm, an iodine number of from about 2500 to about 3500 mg/gm, a total pore volume of from about 1.0 to about 2.8 cc/gm, and a bulk density of from about 0.27 to about 0.32 gm/cc. The granules are activated by treatment with steam to provide granules having particle diameters of from about 0.17 to about 0.71 mm, and pore size distribution and adsorptive capacity essentially unchanged from that of the carbon powder. The granules are particularly effective for the treatment of drinking water to reduce the level of undesirable contaminants.

9 Claims, 1 Drawing Sheet

GRANULATED ACTIVATED CARBON FOR WATER TREATMENT

This is a continuation-in-part, of application Ser. No. 226,789, filed 08/01/88 now abandoned.

This invention relates to the granulation of activated carbon powders. More particularly, this invention relates to a process for spherically agglomerating activated carbon powders and to the granulated product produced thereby, which product is particularly useful for water treatment.

BACKGROUND OF THE INVENTION

Activated carbons are well known and widely used for the removal of organic contaminants, chlorinated hydrocarbons, and free chlorine from drinking waters. Activated carbon powders are generally employed in static, batch processes. In a dynamic flow system, however, granulated activated carbons are required in order to provide useful flow rates. A column packed with granulated activated carbon can be used in a flow system which has the advantage of high levels of contaminant removal since the contaminant loading passes through the column as a wave.

When contaminated water is passed through a bed of granulated activated carbon, a wave or mass transfer zone is formed in the bed by continuous adsorption of contaminants. The contaminants are rapidly adsorbed in the front layers of the bed until the amount is in equilibrium with the inlet contamination concentration. At this point, the front layer is loaded to capacity and this zone of the bed is exhausted. Below the exhausted zone additional dynamic adsorption occurs in a second zone This zone is the mass transfer zone and its depth is controlled by factors such as nature of the contaminants, characteristics of the adsorbent, and hydraulic factors related to fluid flow. Once formed, the mass transfer zone moves down the bed until it reaches the outlet, whereupon the outlet concentration of contaminants rises sharply.

To effectively utilize a bed of granulated activated carbon adsorbent, it is essential to have a narrow mass transfer zone so that a sharp wave will pass through the bed and not allow early leakage of contaminants. To achieve this with granulated activated carbon, it is critical to have favorable adsorption dynamics, particularly fast transport of contaminants into the pores of the granule together with high adsorption capacity of the carbon powder within the granule.

In accordance with this invention, a granulated activated carbon is prepared by the steps of (1) agglomerating the activated carbon powder in an aqueous slurry to produce spherical granules having a particle diameter of from about 0.17 mm to about 0.71 mm with a mean value of about 0.43 mm; (2) separating and drying the granules; and (3) activating the granules by treatment with steam at a temperature of from about 105° to about 120°.

To provide the desired adsorptive and flow properties, the major portion of the granules consists essentially of an activated carbon powder having a surface area of from about 2800 to about 3500 m$^2$/gm, an iodine number of from about 2500 to about 3800 mg/gm, a total pore volume of from about 1.0 to about 2.8 cc/gm, and a bulk density of from about 0.27 to about 0.32 gm/cc. A particularly useful active carbon can be prepared from coal coke, petroleum coke, or a mixture thereof by heating with hydrous potassium hydroxide at a first lower temperature and then at a second higher temperature to yield a very high surface area active carbon powder having a cage-like structure exhibiting microporosity. The preparation of such carbons is disclosed in Wennerberg, U.S. Pat. No. 4,082,694 which patent is incorporated herein by reference. The carbon powder has extremely high adsorptive capacity for water contaminants, and can be successfully employed in static batch processes to remove contaminants.

Because of its fine particle size, however, the above-described carbon does not provide satisfactory flow rates in a dynamic flow system. Agglomerating the carbon powder to produce granules can be effected by conventional methods utilizing clay, lignin, and such binders as disclosed, for example, in Lloyd, U.S. Pat. No. 3,352,788. Granules so prepared generally provide satisfactory flow rates in dynamic water treating systems; the adsorptive capacity of the carbon, however, is seriously deteriorated. This is particularly true for very high surface area carbons where the binder will frequently plug the small micro-pores where much of the surface area lies.

A critical feature of this invention is an agglomeration process which produces spherical granules that provide excellent flow rates and, at the same time, an essentially undiminished adsorptive capacity. The agglomeration process comprises mixing with good agitation an aqueous slurry containing from about 10% to about 15% by weight of carbon powder with from about 40% to about 60% by weight, based on the weight of the carbon, of a hydrocarbon bridging liquid together with up to about 10% by weight, based on the weight of the carbon, of a binder to improve granule strength. The bridging liquid is preferably a hydrocarbon such as, for example, hexane, heptane, naphtha, kerosene, or toluene. The binder is suitably a clay or mineral such as, for example, dolomite, kaolin, talc, and the like. Polymeric binders, in amounts ranging from about 5 to about 25%, based on the weight of the carbon powder, can also be employed. Examples are the known water-insoluble adhesive polymers and copolymers of acrylic esters, methacrylic esters, acrylamides, and methacrylamides. Lignins modified, for example, with hexamethylene tetramine serve as suitable binders. Water-soluble, thermosetting polymers can also be used, for example, melamine-formaldehyde compositions as disclosed in Lloyd, U.S. Pat. No. 3,544,502. When the desired particle size distribution of from about 0.17 mm to about 0.71 mm is reached, the granules are separated and dried to remove most of the bridging liquid and water. The general process for obtaining spherical granules is disclosed in Farnand et al., U.S. Pat. No. 4,029,567 which patent is incorporated herein by reference.

The dried granules are then activated by treatment with steam, suitably under a pressure of about 5 psig, corresponding to a temperature of about 109° C., for a period of about 45 minutes. In the agglomeration and activation process, the pore size distribution of the carbon particles within the granule remains essentially unaltered. In particular, the small micro-pores in the virgin powder, having a pore diameter of <10 A° and responsible for most of the surface area, are retained, as well as the meso-pores (20–200 A° diameter) and macro-pores (>1000 A°) which provide effective transport of contaminants into the particle. Thus the agglomerated granules exhibit a trimodal pore volume distribution, i.e. peak volumes in each of the micro-pore, meso-pore, and macro-pore ranges. The presence of significant pore volumes in the meso- and macro-pore ranges provides an open pore structure which permits ready access of contamination to the adsorbing micro-pore structure and results in rapid and efficient attainment of adsorption equilibrium.

DESCRIPTION OF THE PREFERRED EMBODIMENTS

Figure 1:
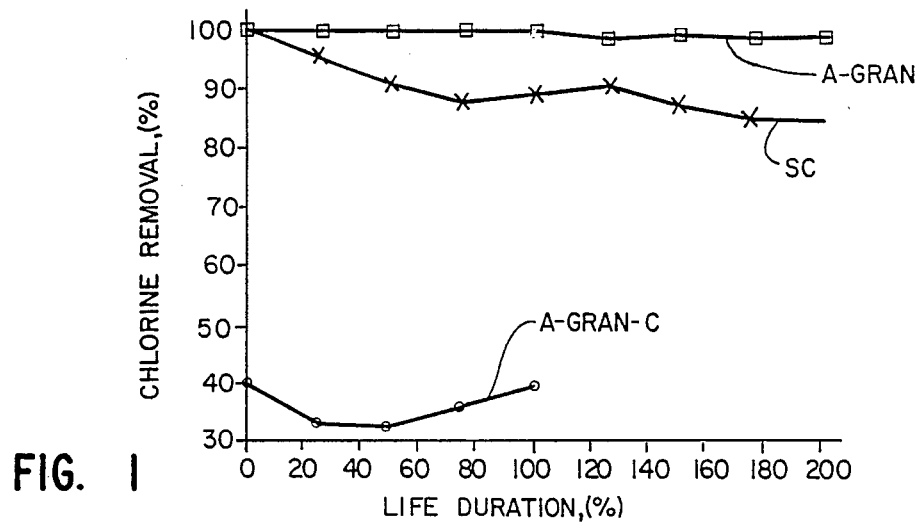
FIG. 1 compares the effectiveness for removal of chlorine from water of granules made in accordance with this invention with granules made by a conventional compression technique and with widely used, commercially available granules.

The invention is further illustrated by reference to the following procedures and examples.

EXAMPLE 1

An aqueous slurry containing 100 gm activated carbon powder in one liter of water was prepared with vigorous stirring. The carbon powder had a surface area of 2897 m$^2$/gm, an iodine number of 3888 mg/gm, a total pore volume within the range of from 1.4 to 2.8 cc/gm, and a bulk density within the range of from 0.27 to 0.32 gm/cc. To the aqueous slurry was added 50 gm of heptane bridging liquid containing 10 gm of finely ground dolomite binder, and vigorous stirring was continued at room temperature for about 30 minutes. The mean diameter of the carbon grains was initially about 15 microns. Agglomeration provided granules having a mean diameter of about 400 microns. The granules were separated and dried in a nitrogen atmosphere for about 3 hours in an oven at a temperature of about 121° C.

The dried granules were then activated by treatment with saturated steam for about 45 minutes at a pressure of 5 psig corresponding to a temperature of 109° C. The formed granules had the size distribution shown in Table I.

TABLE I

| Tyler Mesh | Weight, % | Particle diameter, mm |
|---|---|---|
| 10 × 20 | 1.4 | 1.4 |
| 20 × 25 | 0.5 | 0.77 |
| 25 × 40 | 48.3 | 0.56 |
| 40 × 50 | 31.2 | 0.36 |
| 50 × 80 | 18.5 | 0.24 |

The surface properties were determined for the virgin powder and for the granules of Example 1. In addition, surface properties were determined for granules prepared in the conventional manner of mixing the virgin powder with a binder and forming the granules by compression. In Table II, the virgin powder is identified as A-Powder, the granule prepared in Example 1 as A-Gran, and the granule prepared by compression as A-Gran-C. Surface area was determined by the BET technique with the nitrogen adsorption isotherm in parallel to define the pore size distribution as well. Mercury porosimetry was also utilized to measure pore size distribution in the meso-pore (40–200 A°) and the macro-pore (>1000 A°) ranges. Iodine number was determined as a measure of the static adsorption capacity of the carbon. The iodine number is defined as the milligrams of iodine adsorbed from an aqueous iodine-potassium iodide solution by one gram of the material when the concentration of the residual filtrate is 0.02 normal.

TABLE II

| Sample | m$^2$/gm | I No. mg/gm |
|---|---|---|
| A-Powder | 2897 | 3888 |
| A-Gran | 2380 | 2840 |
| A-Gran-C | 2112 | 1300 |

The data in Table II clearly show that for the A-Gran granules prepared in accordance with this invention, the pore volumes for particles in the 40–200 A° are essentially unchanged while those in the 1000–10000 A° range retain about 40% of the value found in the virgin powder which provides adequate macro-pore volume for effective transport into the particle. In contrast, the A-Gran-C granules prepared by compression retained only about 17% of the macro-pore volume of the virgin powder, and also exhibited a significant drop in adsorptive capacity as indicated by the drop in iodine number from 3888 to 1300 mg/gm.

The effectiveness of the A-Gran granules for water treatment is shown in FIG. 1 where they are compared with the A-Gran-C granules and with a widely used, commercially available carbon for water treatment identified as SC. Evaluation of these carbons was carried out in an accelerated dynamic adsorption test in which a 7 cc sample of carbon granules is placed in a glass burette and water containing 25 ppm of chlorine is pumped through the bed of granules at a rate of 28 cc/minute. Passage of one gallon of chlorine-containing water through the bed is defined as 100% life for the carbon. The accelerated test procedure was found to correlate well with the NSF Standard 42 Test of the National Sanitation Foundation, Ann Arbor, Mich., which test is used to evaluate water treatment cartridges for removal of contaminants.

FIG. 1 shows that A-Gran granules prepared in accordance with this invention have superior adsorption properties. The removal of chlorine was essentially 100% for the 100% life duration of the test, and 98+% for 200% life duration. The commercial carbon showed about 90% chlorine removal at the 100% life point, and about 85% removal at the 200% life point. The A-Gran-C granules, in contrast, showed poor performance with only 40% chlorine removal initially and at the 100% life point.

EXAMPLE 2

Granules were prepared according to the procedure described in Example 1 from an activated carbon powder mixture containing 75% of the preferred carbon A-Powder and 25% of a commercially available carbon powder (B) having a surface area in the range of from 950 to 1050 m$^2$/gm and an iodine number of about 955 mg/gm Hexane was used as the bridging liquid and kaolin clay as the binder. The granules were separated from the slurry and were dried in a nitrogen atmosphere at 115° C. for 4 hours. A portion of the granules was subjected to a further drying period of 4 hours at 115° C. in a nitrogen atmosphere. A second portion of the dried granules was activated with saturated steam at 5 psig for a period of 45 minutes. The formed granules had the size distribution shown in Table III.

TABLE III

| Tyler Mesh | Weight, % | Particle diameter, mm |
|---|---|---|
| 10 × 20 | 2.0 | 1.4 |
| 20 × 25 | 2.0 | 0.77 |
| 25 × 40 | 46.0 | 0.56 |
| 40 × 50 | 40.2 | 0.36 |
| 50 × 80 | 9.8 | 0.24 |

The surface properties and adsorption characteristics of the prepared granules are shown in Table IV.

TABLE IV

| 75% A/25% B Sample | Area $m^2$gm | I No. mg/gm |
|---|---|---|
| SD(single dried) | 1669 | 640 |
| DD(double dried) | 1669 | 630 |
| SA(steam activated) | 1669 | 1300 |

The data in Table IV show that steam activation significantly improves adsorption properties of the granules as measured by the iodine number values. The data also show that additional drying alone (DD sample) did not provide the improvement in iodine number that was obtained by steam activation.

Figure 2:
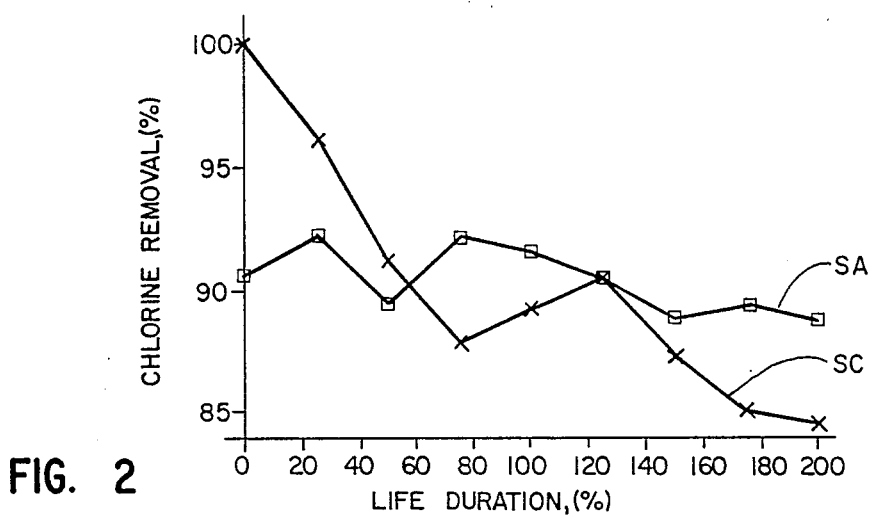
FIG. 2 compares the effectiveness for removal of chlorine from water of granules made in accordance with this invention from a carbon powder mixture containing 75% of the preferred carbon powder and 25% of a less suitable, commercially available carbon powder with the effectiveness of the widely used, commercially available granules.

FIG. 2 shows the performance, as measured in the accelerated dynamic adsorption test, of the SA granules and of the commercially available SC granules. Although the SA granules contained only 75% of the preferred carbon A-Powder, the chlorine removal capability compares favorably with that of the commercially available granules, particularly in extended life service.

EXAMPLE 3

Three sets of granules were prepared according to the procedure described in Example 1. The first set, identified as 75%A/25%C, was prepared from an activated powder mixture containing 75% of carbon A-Powder and 25% of a commercially available carbon powder (C) having a surface area of 918 $m^2$/gm and an iodine number of 1100 mg/gm. The second set, identified as 50%A/50%C, was prepared from equal amounts of the two carbons. The third set, identified as 00%A/100%C, was prepared from 100% of carbon (C). About 50 gm of toluene was used as the bridging liquid and 12 gm of finely ground clay as the binder in each of the three preparations above.

The formed granules had the size distribution shown in Table V.

TABLE V

| Tyler Mesh | Weight, % | Particle diameter, mm |
|---|---|---|
| 10 × 20 | 1.0 | 1.4 |
| 20 × 25 | 3.0 | 0.77 |
| 25 × 40 | 46.0 | 0.56 |
| 40 × 50 | 44.2 | 0.36 |
| 50 × 80 | 5.2 | 0.24 |

The surface properties and adsorption characteristics of the granules are shown in Table VI.

TABLE VI

| Sample | Area $m^2$/gm | I No. mg/gm |
|---|---|---|
| 75% A/25% C | 1654 | 1550 |
| 50% A/25% C | 1249 | 1248 |
| 00% A/100% C | 819 | 740 |

EXAMPLE 4

This example illustrates the continuous production of spherically agglomerated granules.

An aqueous slurry containing 100 gm of activated carbon powder was prepared with moderate agitation in 10 liters of water. The carbon powder was a blend of 500 gm of carbon A-Powder having a surface area of 2897 $m^2$/gm and an iodine number of 3888 mg/gm with 500 gm of a commercially available carbon powder having a surface area of 950 $m^2$/gm and an iodine number of 955 mg/gm. An organic binder, lignin modified with hexamethylene tetramine, was added to the slurry in amount of 100 gm.

The slurry was then pumped into a 4 liter vessel at a rate of 150 gm/min where it was agitated vigorously and mixed with hexane bridging liquid added at a rate of 7 gm/hr to provide a ratio of carbon powder to bridging liquid of about 2:1. The residence time in the vessel was about 30 minutes.

The vessel was equipped with an overflow tube from which a stream was pumped through a screen to collect the desired granules and smaller carbon particles which were recycled to the 4 liter vessel. The granules were transferred to a column steamer where heating served to set the binder and to activate the granules by displacing the bridging liquid from the surface of the granules. Steam activation was carried out at a temperature of 110° C. for 45 minutes at a pressure of 5 psig. The finished granules were spherical in shape with a corrugated surface resembling a raspberry.

Figure 3:
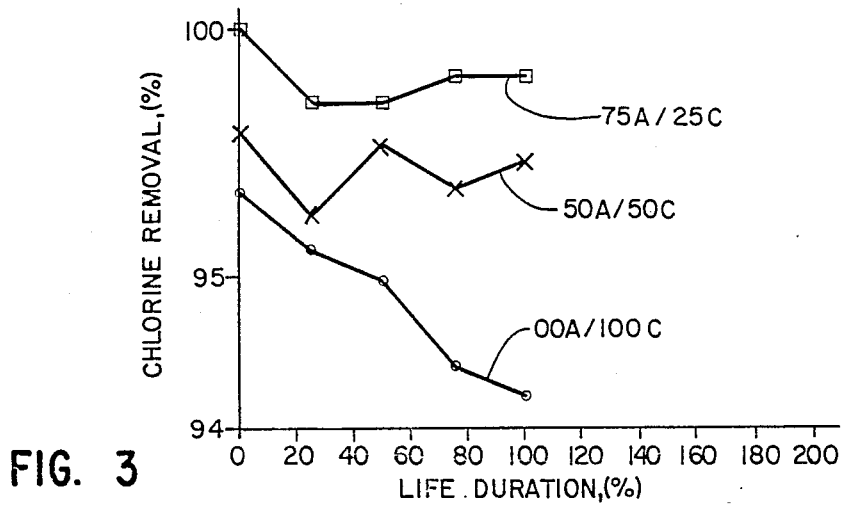
FIG. 3 compares the effectiveness for removal of chlorine from water of granules made in accordance with this invention from mixtures containing 75%/25%, 50%/50%, and 0%/100% of the preferred carbon powder and a less suitable, commercially available carbon powder.

FIG. 3 shows the dynamic adsorption performance of the three types of granules, as measured in the accelerated test procedure. The data show the direct correspondence of performance with the level of the preferred carbon A-Powder. The data further illustrate the successful application of the spherical agglomeration process and the steam activation process of this invention to the production of highly effective granules for water treatment.

Although this invention has been disclosed in detail with particular reference to certain preferred embodiments thereof, it is understood that variations and modifications can be effected within the spirit and scope of the appended claims. It is intended that all material contained in the above description and figures shall be interpreted in an illustrative and not in a limiting sense.

What is claimed is:

1. A process of preparing a spherically-shaped, agglomerated granuled carbon composition from an activated carbon powder, the major portion of which is a carbon powder having a surface area of from about 2800 to about 3800 $m^2$/gm and exhibiting a trimodal pore volume distribution of peak volumes in the micropore size of $<10$ A°, the meso-pore size of from about 40 to about 200 A°, and a macro-pore side of $>1000$ A°, which process comprises the steps of:

(a) mixing with agitation to form spherically-shaped granules an aqueous slurry of the carbon powder with from about 40 to about 60%, based on the weight of the carbon, of a hydrocarbon bridging liquid, and from about 5 to about 25%, based on the weight of the carbon, of a binder selected from the group consisting of clays and organic polymer adhesives;

(b) separating and drying the granules; and (c) activating the granules by steam treatment at a temperature of about from 105° to about 120° C. to produce granules having particle diameters of from about 0.17 to about 0.71 mm.

2. The process of claim 1 wherein the carbon powder present in major amount is derived from the group consisting of coal coke, petroleum coke, and mixtures thereof.

3. The process of claim 1 wherein the hydrocarbon bridging liquid is selected from the group consisting of hexane, heptane, naphtha, kerosene, and toluene.

4. The process of claim 1 wherein the polymeric binder is selected from the group consisting of water-insoluble polymers and copolymers of acrylic esters, methacrylic esters, acrylamides, and methacrylamides.

5. The process of claim 1 wherein the polymeric binder is selected from the group consisting of thermosetting melamineformaldehyde compositions.

6. The process of claim 1 wherein the bridging liquid is hexane and the binder is lignin modified with hexamethylene tetramine.

7. A process for preparing a spherically-shaped, agglomerated granulated carbon composition from an activated carbon powder, the major portion of which is a carbon powder having a surface area of from about 2800 to about 3800 $m^2$/gm and exhibiting a trimodal pore volume distribution of peak volumes in the micro-pore size of $<10$ A°, the meso-pore size of from about 40 to about 200 A°, and the macro-pore size of $>1000$ A°, which process comprises the steps of:

(a) mixing with agitation to form spherically-shaped granules an aqueous slurry of the carbon powder with from about 40 to about 60%, based on the weight of the carbon, of a hydrocarbon bridging liquid, and from about 5 to about 25%, based on the weight of the carbon, of a binder selected from the group consisting of kaolin, dolomite, and talc;

(b) separating and drying the granules; and (c) activating the granules by steam treatment at a temperature of from about 105° to about 120° C. to produce granules having particle diameters of from about 0.17 to about 0.71 mm.

8. The process of claim 7 wherein the bridging liquid is heptane and the binder is dolomite.

9. The process of claim 7 wherein the bridging liquid is hexane and the binder is kaolin.

* * * * *